(12) United States Patent
Shen et al.

(10) Patent No.: US 10,442,390 B2
(45) Date of Patent: Oct. 15, 2019

(54) UNDERCOVER ASSEMBLIES INCLUDING UNDERCOVER REINFORCEMENT MEMBER

(71) Applicant: TOYOTA MOTOR ENGINEERING & MANUFACTURING NORTH AMERICA, INC., Erlanger, KY (US)

(72) Inventors: Mingher Fred Shen, Ann Arbor, MI (US); Nicholas H. Augustyn, Ypsilanti, MI (US); Revathy Dasan Muthiah, Saline, MI (US)

(73) Assignees: Toyota Motor Engineering & Manufacturing North America, Inc., Plano, TX (US); Hinduja Tech, Inc., Novi, MI (US)

( * ) Notice: Subject to any disclaimer, the term of this patent is extended or adjusted under 35 U.S.C. 154(b) by 78 days.

(21) Appl. No.: 15/686,466

(22) Filed: Aug. 25, 2017

(65) Prior Publication Data

US 2019/0061678 A1   Feb. 28, 2019

(51) Int. Cl.
*B60R 21/34* (2011.01)
*B60R 19/12* (2006.01)
*B60R 19/18* (2006.01)

(52) U.S. Cl.
CPC .............. *B60R 21/34* (2013.01); *B60R 19/12* (2013.01); *B60R 2019/1886* (2013.01); *B60R 2021/343* (2013.01)

(58) Field of Classification Search
CPC . B60R 21/34; B60R 19/12; B60R 2019/1886; B60R 2021/343
See application file for complete search history.

(56) References Cited

U.S. PATENT DOCUMENTS 7,434,872 B2 * 10/2008 Steller .................... B60R 19/18
                                                               296/155
7,887,125 B2    2/2011 Tazaki et al.

FOREIGN PATENT DOCUMENTS

| CN | 20278305   | 3/2013  |
| CN | 205601596  | 9/2016  |
| JP | 2004098912 | 4/2004  |
| JP | 3937293    | 6/2007  |
| JP | 5067139    | 11/2012 |

* cited by examiner

*Primary Examiner* — D Glenn Dayoan
*Assistant Examiner* — Melissa A Black
(74) *Attorney, Agent, or Firm* — Dinsmore & Shohl LLP (57) ABSTRACT

A vehicle includes a front fascia having a lower bumper region extending outwardly in a vehicle longitudinal direction at a bottom of a front end assembly. An undercover assembly is located rearward of the front fascia and has an undercover body including a front edge located at the lower bumper region. The undercover assembly includes an undercover reinforcement member that is connected to a surface of the undercover body and extends along a length of the undercover body to increase a stiffness within at least a region of the undercover body.

19 Claims, 7 Drawing Sheets

UNDERCOVER ASSEMBLIES INCLUDING UNDERCOVER REINFORCEMENT MEMBER

TECHNICAL FIELD

The present specification generally relates to undercover assemblies and vehicles that include undercover assemblies, and more specifically, undercover assemblies that include an undercover reinforcement member.

BACKGROUND

Vehicles may be equipped with bumper assemblies and impact protection structures that elastically and plastically deform to absorb energy in the event of an impact. Vehicles may also include various protective features that protect vehicle components from environmental conditions, such as water and salt, and road debris. For example, many vehicles include an undercover that protects a vehicle engine and/or other components from beneath the vehicle. Given the location of many engine compartments at a front of the vehicles, the undercover may also be located at the front of the vehicles. Because the undercovers may be located at the front of the vehicles, the undercovers may have some influence on front impact test results, particularly pedestrian leg impact tests. Accordingly, undercover assemblies are desired that can improve pedestrian leg impact test results.

SUMMARY

In one embodiment, a vehicle includes a front fascia having a lower bumper region extending outwardly in a vehicle longitudinal direction at a bottom of a front end assembly. An undercover assembly is located rearward of the front fascia and has an undercover body including a front edge located at the lower bumper region. The undercover assembly includes an undercover reinforcement member that is connected to a surface of the undercover body and extends along a length of the undercover body to increase a stiffness within at least a region of the undercover body.

In another embodiment, an undercover assembly is located within a lower bumper region of a front fascia of a vehicle. The undercover assembly includes an undercover body including a front edge sized to be located within the lower bumper region. An undercover reinforcement member is connected to a surface of the undercover body. The undercover reinforcement member is formed of a harder material than the undercover body.

In another embodiment, a method of changing a characteristic of an undercover assembly is provided. The method includes increasing a stiffness of at least a portion of an undercover body of the undercover assembly by connecting an undercover reinforcement member to a surface of the undercover body. A front edge of the undercover body is located within a lower bumper region of a front fascia.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Vehicles according to the present specification include a vehicle including a front fascia and a bumper reinforcement beam that extends in a vehicle lateral direction that is covered by the front fascia at a front of the vehicles. Located below the bumper reinforcement beam is an undercover assembly that is connected at an underside of the vehicle frame. The undercover assembly extends forward from a support structure to which the undercover assembly is connected toward the front fascia. The undercover assembly includes an undercover reinforcement member connected thereto that reinforces the undercover assembly in a vehicle longitudinal direction.

Figure 1:
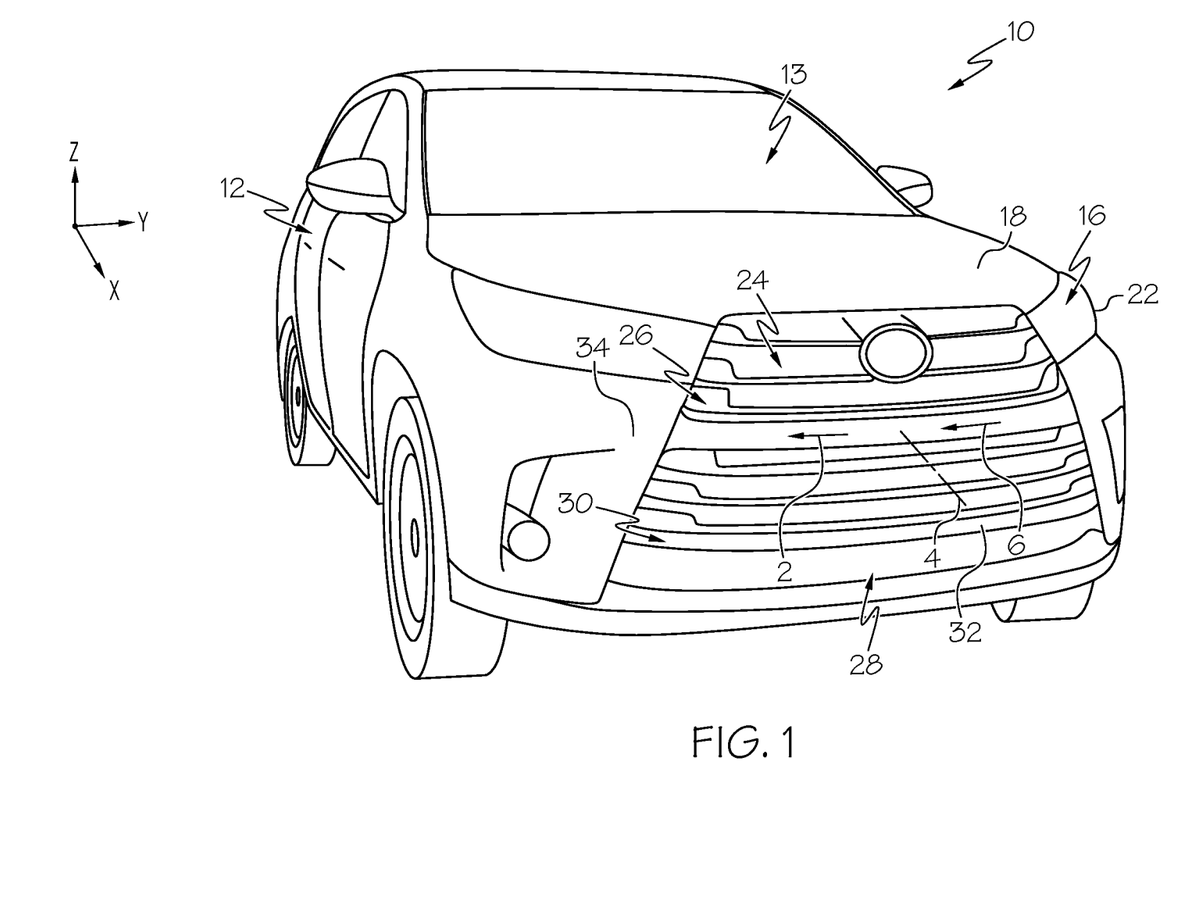
FIG. 1 depicts a perspective view of a vehicle according to one or more embodiments shown or described herein.

As used herein, the term "vehicle longitudinal direction" refers to the forward-rearward direction of the vehicle (i.e., in the +/− vehicle X-direction depicted in FIG. 1). The term "vehicle lateral direction" refers to the cross-vehicle direction (i.e., in the +/− vehicle Y-direction depicted in FIG. 1), and is transverse to the vehicle longitudinal direction. The term "vehicle vertical direction" refers to the upward-downward direction of the vehicle (i.e., in the +/− vehicle Z-direction depicted in FIG. 1). Further, the terms "inboard," "inward," "outboard" and "outward" are used to describe the relative positioning of various components of the vehicle. Referring to FIG. 1, the terms "outboard" or "outward" as used herein refers to the relative location of a component in direction 2 with respect to a vehicle centerline 4. The term "inboard" or "inward" as used herein refers to the relative location of a component in direction 6 with respect to the vehicle centerline 4. Because the vehicle structures may be generally symmetrical about the vehicle centerline 4, the direction to which use of terms "inboard," "inward," "outboard" and "outward" refer may be mirrored about the vehicle centerline 4 when evaluating components positioned along opposite sides of the vehicle 10.

Motor vehicles that incorporate elements according to the present disclosure may include a variety of construction methodologies that are conventionally known, including a unibody construction methodology as well as a body-on-frame construction methodology.

Referring initially to FIG. 1, a vehicle 10 is depicted. The vehicle 10 includes a body 12 onto which a vehicle drivetrain is coupled. The vehicle 10 also includes a cabin 13 that is integral with the body 12. The cabin 13 generally defines a passenger cabin of the vehicle 10. The vehicle 10 includes a front end assembly 16 that includes a hood 18, front fenders 20 and 22, an upper grille assembly 24, a front bumper assembly 26 and a lower grille assembly 28 extending between the front fenders 20 and 22. Generally, the upper grille assembly 24 and lower grille assembly 28 include a covering portion 30 with a number of horizontally disposed grille deflectors 32, a mesh or other suitable covering that protects a radiator behind the covering portion 30, while allowing air to flow past the covering and over the radiator. The front end assembly 16 includes an outer covering or front fascia 34 that covers various front components of the vehicle 10.

Figure 2:
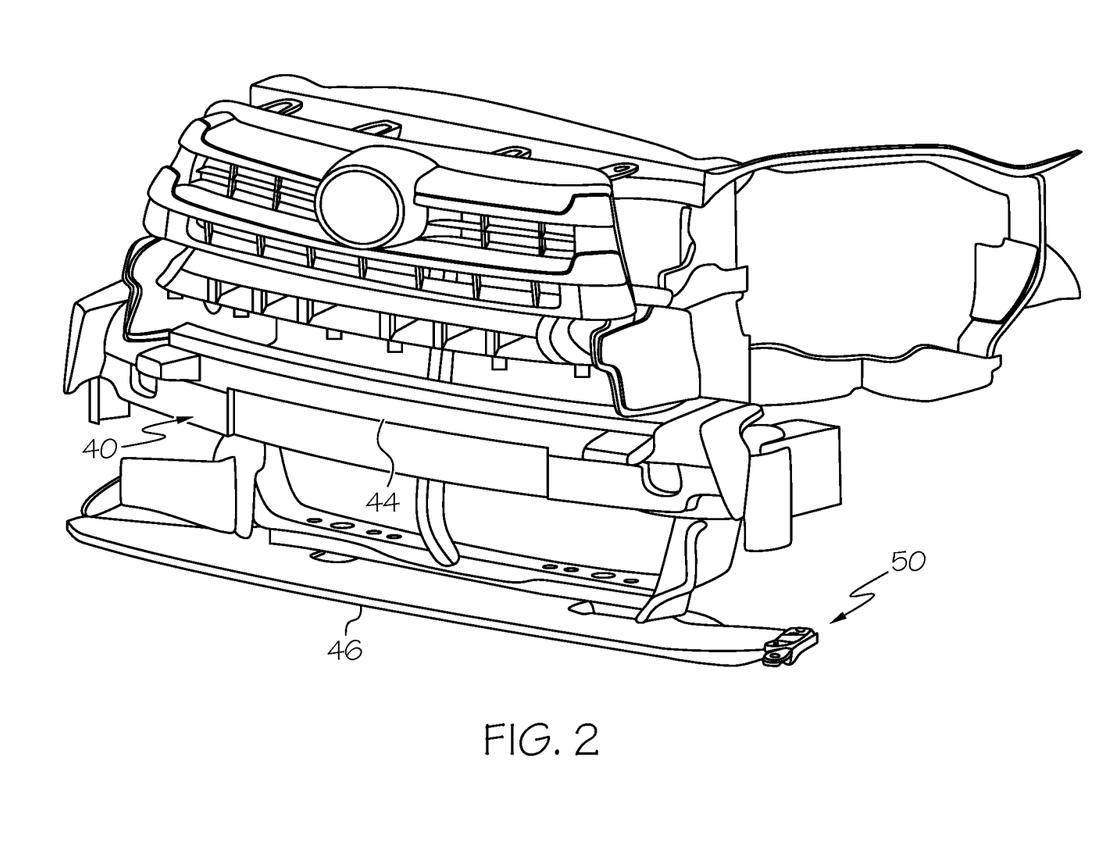
FIG. 2 depicts a perspective view of a front assembly of the vehicle of FIG. 1 with a front fascia removed according to one or more embodiments shown or described herein.

Referring to FIG. 2, the front fascia 34 (removed in FIG. 2) is an outer cover for covering at least a portion of a bumper reinforcement beam 40 that extends in the vehicle lateral direction between the front fenders 20 and 22 (FIG. 1). The bumper reinforcement beam 40 may generally have a curved shape in the vehicle lateral direction and extend forward in the vehicle longitudinal direction to a front face 44. The front fascia 34 can also cover a front edge 46 of an undercover assembly 50. The undercover assembly 50 is located below or closer to the ground than the bumper reinforcement beam 40 and extends forward in the vehicle longitudinal direction to the front edge 46. The front fascia 34 also extends forward to cover the undercover assembly 50, as can be seen by FIG. 1.

Figure 3:
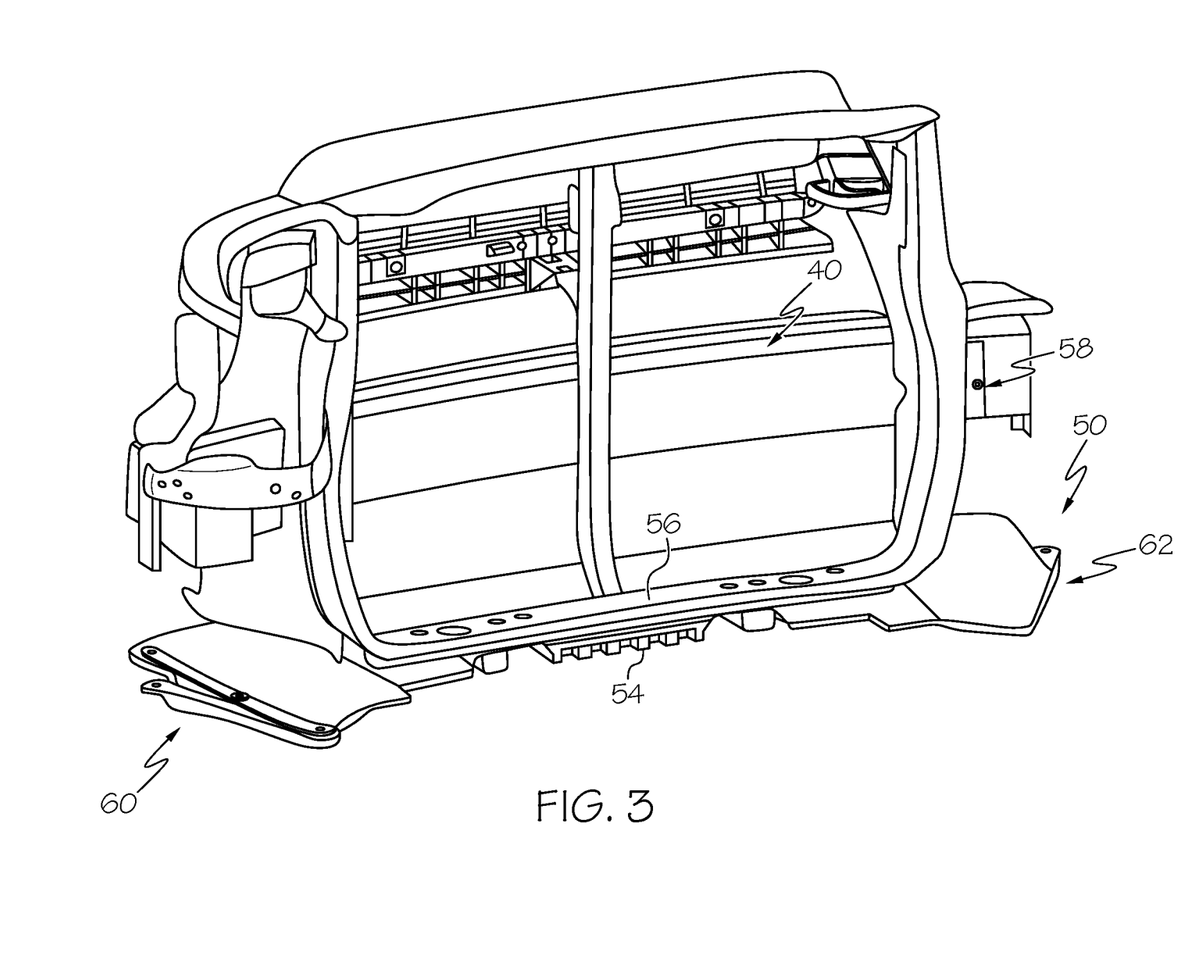
FIG. 3 depicts another perspective view of the front assembly of FIG. 2 according to one or more embodiments shown or described herein.

Referring briefly to FIG. 3, the undercover assembly 50 extends in the vehicle lateral direction underneath the bumper reinforcement beam 40. The undercover assembly 50 is somewhat plate-like, having a length in the vehicle longitudinal direction and a width in the vehicle lateral direction. In some embodiments, a rear edge 54 of the undercover assembly 50 may extend beneath a lower support beam 56 of a radiator support structure 58. The undercover assembly 50 may be connected to the lower support beam 56 along the rear edge 54. As can be seen, outer end portions 60 and 62 extend outwardly beyond the lower support beam 56 of the radiator support structure 58 to opposite sides of the vehicle 10.

Figure 4:
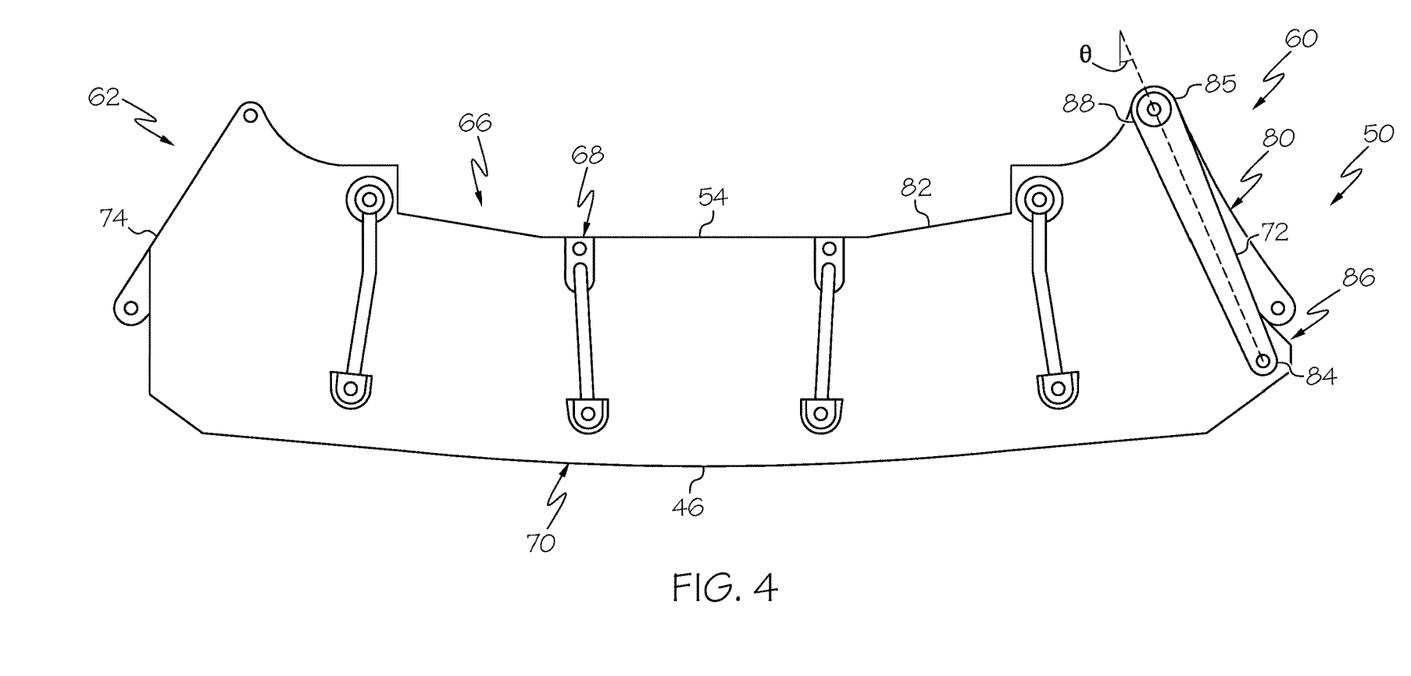
FIG. 4 depicts a top view of an undercover assembly for use with the front assembly of FIG. 2 according to one or more embodiments shown or described herein.

Referring to FIG. 4, the undercover assembly 50 is illustrated in isolation. The undercover assembly 50 includes an undercover body 66 having the rear edge 54, the front edge 46 and the outer end portions 60 and 62 that extend between the rear edge 54 and the front edge 46. A plurality of fastening locations 68 are provided along the rear edge 54 for connecting to the lower support beam 56 of the radiator support structure 58. The front edge 46 may also include a plurality of fastening locations 70 for connecting to the front fascia 34. As can be seen, the outer end portions 60 and 62 each include a side edge 72 and 74 that extend both longitudinally and laterally from the rear edge 54 to the front edge 46. In some embodiments, the undercover assembly 50 may have a general shape of an arc segment that is curved to correspond to the shape of the front fascia 34 of the vehicle 10.

The undercover assembly 50 includes an undercover reinforcement member 80 that is mounted to an upper facing surface 82 of the undercover assembly 50. The undercover reinforcement member 80 may be in the form of a rod that extends at an angle θ to the longitudinal direction. In some embodiments, the undercover reinforcement member 80 is located at the outer end portion 60, extending along the side edge 72. The undercover reinforcement member 80 may include a rear end 85 that is located at the rear edge 54 of the undercover body 66 and a front end 84 that is located at the front edge 46 of the undercover body 66. The rear end 85 and the front end 84 may both include fastening locations 86 and 88 that are fastened (e.g., bolted) at the rear edge 54 and the front edge 46 of the undercover body 66. In some embodiments, the undercover reinforcement member 80 may extend over the length (e.g., such as at least about 50 percent, such as at least about 75 percent) of the length of the undercover body 66 in the vehicle longitudinal direction.

In the illustrated embodiment, the undercover reinforcement member 80 is located along a discrete line at the outer end portion 60 of the undercover body 66. The undercover reinforcement member 80 extends from the rear edge 54 to the front edge 46 to reinforce the undercover body 66 in the vehicle longitudinal direction. The undercover reinforcement member 80 may be formed of a material that is harder than material forming the undercover body 66. As an example, the undercover body 66 may be formed of a plastic, such as polypropylene, and the undercover reinforcement member 80 may be formed of a metal, such as steel. The undercover reinforcement member 80 may be located on the upper facing surface 82 to be positioned facing away from an exterior of the vehicle 10 and protected from excessive exposure to the environment by the undercover body 66.

Figure 5:
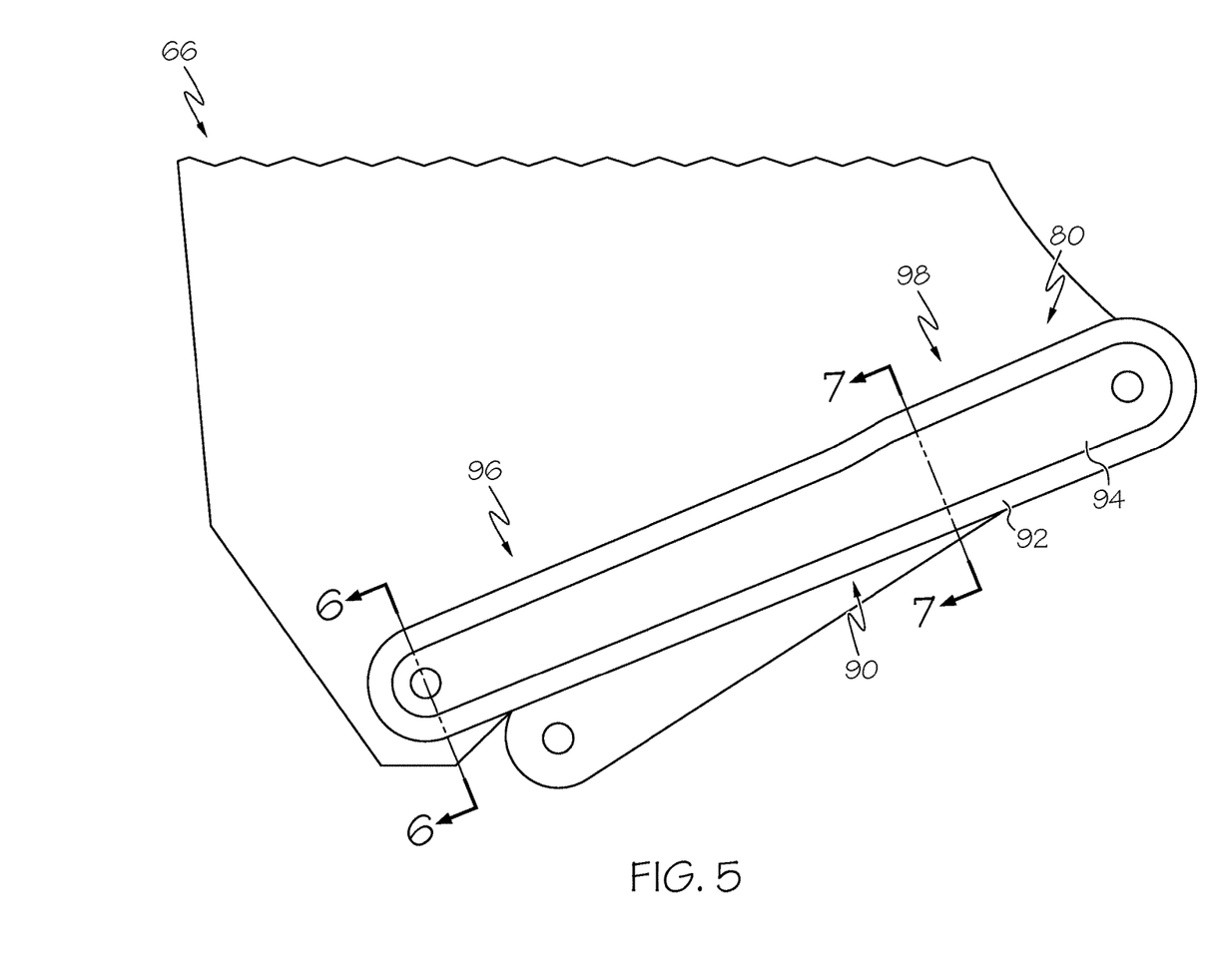
FIG. 5 depicts a detail view of the undercover assembly of FIG. 4 according to one or more embodiments shown and described herein.

Referring to FIG. 5, the undercover reinforcement member 80 is illustrated in greater detail connected to the undercover body 66. The undercover body 66 includes a recess region 90 that is sized to receive the undercover reinforcement member 80 therein. The recess region 90 is formed by a raised perimeter wall 92 that is shaped to extend about a periphery 94 of the undercover reinforcement member 80. The undercover reinforcement member 80 includes a forward portion 96 and a rearward portion 98. In the illustrated embodiment, the forward portion 96 is narrower than the rearward portion 98 in the vehicle lateral direction. However, other shapes may be possible depending on vehicle geometry and reinforcement constraints.

Figure 6:
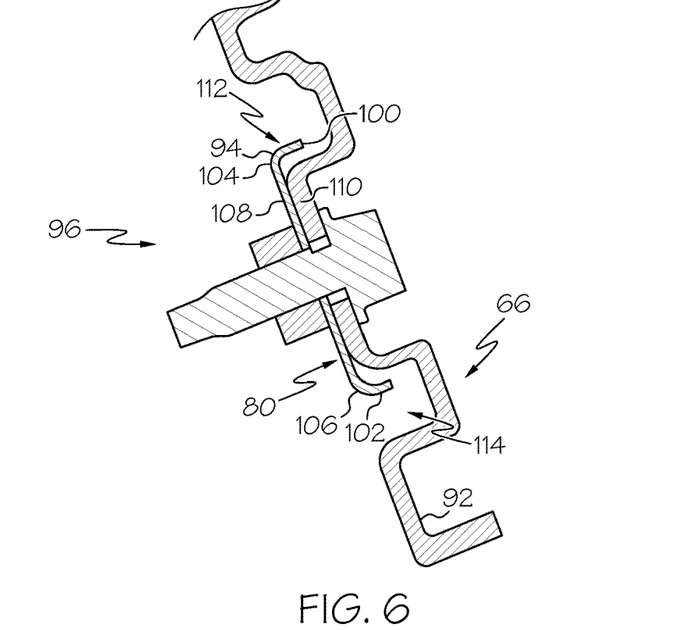
FIG. 6 is a section view along line 6-6 of FIG. 5.

FIG. 6 illustrates a section view of the forward portion 96 of the undercover reinforcement member 80 connected to the undercover body 66. The forward portion 96 of the undercover reinforcement member 80 includes side walls 100 and 102 that extend outwardly from opposite edges 104 and 106 of from a central wall 108 forming a somewhat U-shape. The central wall 108 rests on a raised portion 110 of the undercover body 66, while the side walls 100 and 102 are each received within channels 112 and 114. The channels 112 and 114 are bounded by the perimeter wall 92 that extends about the periphery 94 of the undercover reinforcement member 80. A fastener 116 (e.g., a screw, bolt, etc.) may be used to connect the undercover reinforcement member 80 to the undercover body 66.

Figure 7:
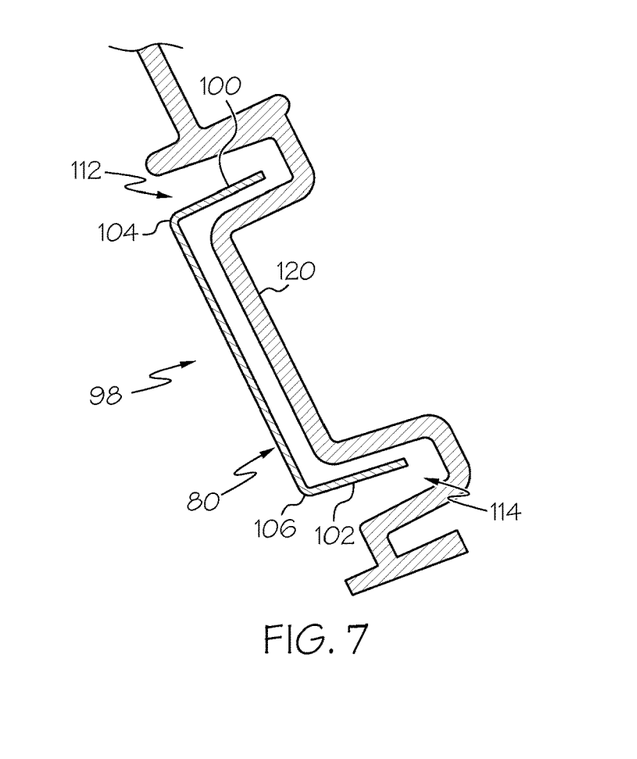
FIG. 7 is a section view along line 7-7 of FIG. 5.

FIG. 7 illustrates a section view of the rearward portion 98 of the undercover reinforcement member 80. The rearward portion 98 of the undercover reinforcement member 80 includes the side walls 100 and 102 that extend outwardly from the opposite edges 104 and 106 from the central wall 108 forming a somewhat U-shape. The central wall 108 of the rearward portion 98 may be wider than the central wall 108 of the forward portion 96. The central wall 108 rests on a raised portion 120 of the undercover body 66, while the side walls 100 and 102 are each received within the channels 112 and 114. The side walls 100 and 102 may have lengths that are longer within the rearward portion 98 than within the forward portion 96.

Figure 8:
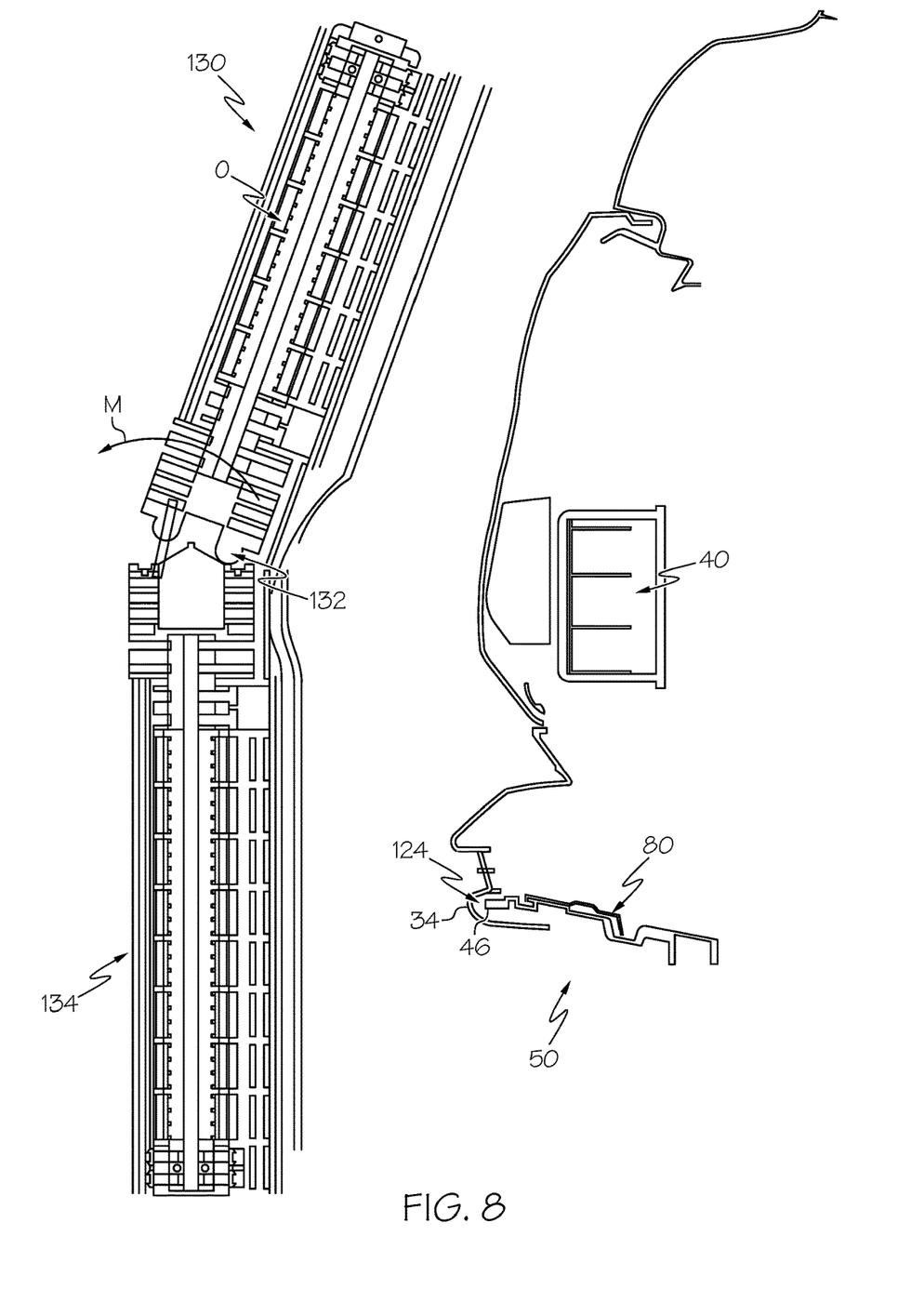
FIG. 8 illustrates the undercover assembly of FIG. 2 in operation according to one or more embodiments shown and described herein.

Referring to FIG. 8, the undercover assembly 50 is located below or closer to the ground than bumper reinforcement beam 40 and extends forward in the vehicle longitudinal direction to the front edge 46 located in a lower bumper region of the front end assembly 16. The front fascia 34 also extends forward to cover the undercover reinforcement member 80. A space 124 may be provided between the front fascia 34 and the undercover assembly 50. The space 124 can allow for some rearward deformation of the front fascia 34 at the undercover assembly 50 before contacting the undercover assembly 50. In other embodiments, the space 124 may not be provided between the front fascia 34 and the undercover assembly 50. For example, the front fascia 34 may be connected directly to the undercover assembly 50 at the front edge 46.

FIG. 8 also illustrates operation of the undercover assembly 50. As a leg impact object O comes into contact with the front end assembly 16 of the vehicle 10, the bumper the relatively stiff bumper reinforcement beam 40 and associated energy absorber structure 128 tends to apply a force against an upper portion 130 of the leg impact object O, causing a moment M around joint 132. Further motion of the leg impact object O into the front end assembly 16 causes the front fascia 34 to close the space 124 between the front fascia 34 and the undercover assembly 50. As a lower portion 134 of the leg impact object O engages the front edge 46 of the undercover assembly 50, a force is applied to the lower portion 134. Without the undercover reinforcement member 80, the force applied to the lower portion 134 of the leg impact object O would be low compared to the force applied to the upper portion 130 at the bumper reinforcement beam 40, which can cause an increased moment M at the joint 132. Providing the undercover reinforcement member 80 can cause the lower portion 134 of the leg impact object O to move with the upper portion 130 thereby decreasing the moment M at the joint 132.

The above-described undercover assemblies with undercover reinforcement member provide a lower reinforcement structure at one of the lowest positions on a front end assembly of the vehicles. The undercover reinforcement member is formed of a harder material than the undercover body, which increases a stiffness within at least a portion of the undercover body. Increasing the stiffness can transfer more force to a lower portion of a leg impact object which can reduce a bending moment in the leg impact object during pedestrian testing. While a single undercover reinforcement member is illustrated above, there may be multiple undercover reinforcement members, for example, spaced-apart in the vehicle lateral direction, depending on a desired stiffness at the undercover assembly.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle comprising:
a front fascia having a lower bumper region extending outwardly in a vehicle longitudinal direction at a bottom of a front end assembly; and
an undercover assembly formed separately from and located rearward of the front fascia and having an undercover body including a front edge located at the lower bumper region behind the front fascia, the undercover assembly comprising an undercover reinforcement member formed of a material different from the undercover body that is connected to a surface of the undercover body and extending along a length of the undercover body to increase a stiffness within at least a region of the undercover body.

2. The vehicle of claim 1, wherein the undercover reinforcement member includes a rear end and an opposite front end, the front end of the undercover reinforcement member being nearer to the front edge of the undercover body than the rear end of the undercover reinforcement member.

3. The vehicle of claim 1, wherein the undercover body is formed of plastic and the undercover reinforcement member is formed of metal.

4. The vehicle of claim 1, wherein the undercover body extends widthwise in a vehicle lateral direction to outer end portions, the undercover reinforcement member being located at an outer end portion.

5. The vehicle of claim 1, wherein the undercover body has a recess region, the undercover reinforcement member being located in the recess region.

6. The vehicle of claim 5, wherein the undercover reinforcement member comprises a central wall and a pair of side walls that extend outwardly from opposite edges of the central wall.

7. The vehicle of claim 6, wherein the pair of side walls is received within a channel of the recess region.

8. The vehicle of claim 5, wherein the recess region has a perimeter wall that extends about a periphery of the undercover reinforcement member.

9. An undercover assembly that is located within a lower bumper region of a front fascia of a vehicle, the undercover assembly comprising:
an undercover body that is formed separately from the front fascia and includes a front edge sized to be located within the lower bumper region behind of the front fascia; and
an undercover reinforcement member connected to a surface of the undercover body, the undercover reinforcement member being formed of a harder material than the undercover body.

10. The undercover assembly of claim 9, wherein the undercover reinforcement member includes a rear end and an opposite front end, the front end of the undercover reinforcement member being nearer to the front edge of the undercover body than the rear end of the undercover reinforcement member.

11. The undercover assembly of claim 9, wherein the undercover body is formed of plastic and the undercover reinforcement member is formed of metal.

12. The undercover assembly of claim 9, wherein the undercover body extends widthwise in a vehicle lateral direction to outer end portions, the undercover reinforcement member being located at an outer end portion.

13. The undercover assembly of claim 9, wherein the undercover body has a recess region, the undercover reinforcement member being located in the recess region.

14. The undercover assembly of claim 13, wherein the undercover reinforcement member comprises a central wall and a pair of side walls that extend outwardly from opposite edges of the central wall.

15. The undercover assembly of claim 14, wherein the pair of side walls is received within a channel of the recess region.

16. The undercover assembly of claim 15, wherein the recess region has a perimeter wall that extends about a periphery of the undercover reinforcement member.

17. A method of changing a characteristic of an undercover assembly, the method comprising:
increasing a stiffness of at least a portion of an undercover body of the undercover assembly by connecting an undercover reinforcement member to a surface of the undercover body; and
locating a front edge of the undercover body within a lower bumper region of a front fascia behind the front fascia.

18. The method of claim 17, wherein the undercover reinforcement member includes a rear end and an opposite front end, the front end of the undercover reinforcement member being nearer to the front edge of the undercover body than the rear end of the undercover reinforcement member.

19. The method of claim 17, wherein the undercover body is formed of a different material than the undercover reinforcement member.

* * * * *

UNITED STATES PATENT AND TRADEMARK OFFICE
CERTIFICATE OF CORRECTION

PATENT NO. : 10,442,390 B2
APPLICATION NO. : 15/686466
DATED : October 15, 2019
INVENTOR(S) : Mingher Fred Shen, Nicholas H. Augustyn and Revathy Dasan Muthiah Page 1 of 1

It is certified that error appears in the above-identified patent and that said Letters Patent is hereby corrected as shown below:

On the Title Page

Item (73) Assignee(s) should read:
Toyota Motor Engineering & Manufacturing North America, Inc. Plano, TX(US)

Signed and Sealed this
Twenty-fourth Day of August, 2021

Drew Hirshfeld
*Performing the Functions and Duties of the
Under Secretary of Commerce for Intellectual Property and
Director of the United States Patent and Trademark Office*